Nov. 1, 1966

J. BAUDE 3,283,174

PHASE COMPARISON MEANS

Filed Dec. 18, 1963

Inventor
John Baude
By R J Falkowski
Attorney

United States Patent Office 3,283,174

Patented Nov. 1, 1966

3,283,174

PHASE COMPARISON MEANS

John Baude, Milwaukee, Wis., assignor to Allis-Chalmers Manufacturing Company, Milwaukee, Wis.

Filed Dec. 18, 1963, Ser. No. 331,550
19 Claims. (Cl. 307—88.5)

This invention relates to phase comparison circuits, particularly to circuits that sense the phases of two or more electrical inputs of alternating polarity to produce an output control signal or pulse at a predetermined phase relationship of the inputs.

A phase comparison circuit according to this invention produces an output signal or pulse when two or more inputs of cyclicly alternating polarity are at predetermined points in their cycles. In the preferred embodiment of this invention the control pulse is produced when the alternating sources received as inputs are simultaneously at zero points in their cycles. Because two zero points occur in each cycle, means are provided to produce the output pulse only when the alternating inputs are in phase at the zero points, that is, are both approaching zero from the same polarity.

The output signal produced may be used to control switching systems. Appropriate time delays or advances may be selected to match the time of response of the particular switching system used. Typical examples of systems that could be controlled include systems that connect two alternating current sources in parallel, and systems that connect one alternating current source to a load at the instant of disconnecting a different alternating source from the load and accomplishing this with little or no significant distortion in the power delivered during the changeover.

A typical example of the latter system is a standby power supply system that is used for connecting a standby power source to a load upon failure of a normal alternating current source. This type of system also usually provides for reconnecting the normal alternating current source to the load upon recovery of the normal alternating current power source and disconnecting the standby power source from the load. This invention is particularly advantageous when applied in standby systems that require accurate phase continuity and minimum distortion at the switchover point.

An advantage of a circuit according to this invention is that it enables the switchover to be accomplished at a zero point in the cycle thereby making it unnecessary that the sources have the same wave cycle and amplitude. As long as the signals are of alternating polarity this invention may be applied to produce accurate switching at the appropriate point in the cycle. For example, if one source produces a step wave output and the other produces a sine wave output it is difficult to accurately switch from one power source to another without effecting a phase shift to the load. With this invention the difficulty is eliminated because the switchover can be accomplished at the zero points of the cycles. Similarly accurate switchover can be accomplished even if all the inputs are of harmonically distorted wave forms.

Another advantage of a circuit according to this invention is that the output pulse produced has a desirable wave form for use as a control pulse. The control pulse produced has a relatively steep leading edge that enables rapid response characteristics to be designed into the overall system responding to the control pulse.

The objects of this invention are to provide: new and improved phase sensing and comparison means; phase comparison means that are simple in construction and relatively inexpensive; means for producing an output control signal when two alternating inputs are in phase; phase comparison means that produce an output control signal when two or more alternating inputs are at a predetermined phase relationship in their cycles; phase comparison means that provide an output signal when two or more alternating inputs are simultaneously at a zero point in their cycles; phase comparison means that produce an output control signal when two or more alternating inputs are in phase at zero points in their cycles; and phase comparison means that produce an output signal having characteristics desirable for use in tripping, switching, and similar circuits.

These and other objects and advantages will appear from the following description and explanation.

Figure 1:
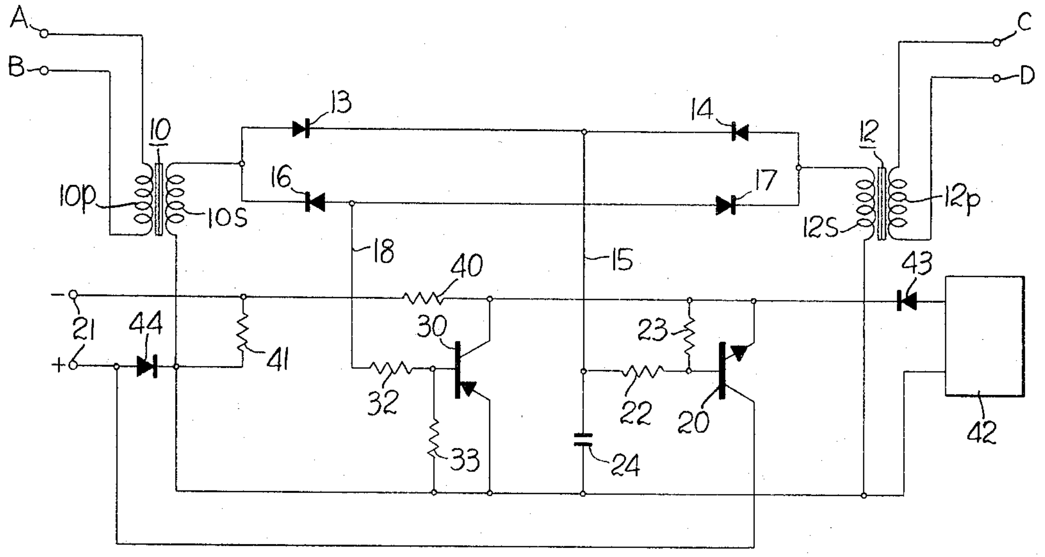
FIGURE 1 is a drawing of a circuit embodying this invention.

Referring to FIG. 1, a pair of input terminals AB are connected to a primary winding 10*p* of a transformer 10, and a pair of input terminals CD are connected to a primary winding 12*p* of a transformer 12. One terminal of secondary windings 10*s* and 12*s* of transformers 10 and 12 respectively are connected to a conductor 15 through diodes 13 and 14 respectively and to a conductor 18 through diodes 16 and 17 respectively.

Conductor 15 is connected to the base of an NPN transistor 20 through a base current limiting resistor 22. A biasing resistor 23 is connected between the base and emitter of transistor 20. A capacitor 24 is connected between conductor 15 and the collector of transistor 20 through a diode 44.

Conductor 18 is similarly connected to the base of a PNP transistor 30 through a base limiting resistor 32. A biasing resistor 33 is connected between the base and emitter of transistor 30.

A source of electrical energy, direct current source 21, is connected to a load 42. The emitter-collector output circuits of the transistors 30 and 20 and a loading resistor 41 are connected in parallel with source 21 and load 42. A limiting resistor 40 is connected between the direct current source and the parallelly connected output circuits of transistors 20 and 30 and load 42. A diode 43 is connected to prevent reverse current flow through load 42.

Diode 44 functions to make the collector of transistor 20 slightly more positive than the emitter of transistor 30 to assure more effective operation of the circuitry.

In the operation of the circuitry, first and second sources of electrical energy of alternating polarities are respectively applied to terminals AB and terminals CD. Gating means connected to receive the input signals are provided for producing a first output varying as an instantaneous function of the positive portions of the input signals and for producing a second output varying as an instantaneous function of the negative portions of the input signals.

The gating means comprises diodes 13 and 14 connected between the sources of the inputs and the base of transistor 20, and diodes 16 and 17 connected between the source of the inputs and the base of transistor 30.

The gating means may comprise transformers 10 and 12 but other means of coupling the input signals to the remainder of the circuitry are known. In some types of systems such a coupling network may not be necessary and direct connections may be used.

In the embodiment shown, the gating means functions to produce an output along conductor 15 varying as an instantaneous function of the sum of the positive portions of the input signals and an output along conductor 18 varying as a function of the sum of the negative portions of the input signals. Electronic switching means or circuits are provided by transistors 20 and 30 with their emitter-collector circuits operating as output circuits. The transistors are connected to receive the positive and negative outputs from the gating means as inputs to their bases and operate with the gating means to control flow of electrical energy from direct current source 21 to load 42 in response to predetermined polarity changes of the first and second sources or inputs. The polarity of the signals applied to the bases of the transistors determine the conditions of their output circuits and provide an on, or conducting condition, and an off, or nonconducting, condition.

When the output along conductor 15 is positive (when the polarity of either one of the inputs is positive) transistor 20 is turned on and effectively reduces the voltage across load 42 to zero. Similarly, when the output along conductor 18 is negative (when the polarity of either one of the inputs is negative) transistor 30 is turned on and effectively reduces the voltage across load 42 to zero. When either one of the inputs is not at zero, at least one of the transistors is turned on. When either one or both of the transistors is on, a short circuit is maintained across the load and the voltage of the direct current source appears across loading resistor 41 and diode 44. The low resistance of the emitter-collector circuits of the conducting transistor or transistors prevents any significant voltage from appearing across load 42.

When both inputs are at zero points, both transistors are turned off and the potential of direct current source 21 appears across limiting resistor 40, diodes 43 and 44, and load 42. The potential appearing across load 42 is the output signal or pulse.

Means are provided for controlling the output condition of one of the switching means to produce the output pulse only when the input signals are in phase at the zero points in their cycles. In this embodiment this means is an electrical energy storage means such as capacitor 24 that functions to maintain transistor 20 conductive for a time, a fraction of a cycle, after its input is no longer positive. Capacitor 24 charges as the positive input is applied to the base of the transistor 20 along conductor 15 and discharges when the potential of the inputs along conductor 15 is zero. The discharging of capacitor 24 keeps transistor 20 conductive by keeping its base positive for a period of time until the capacitor is discharged. Capacitor 24 is selected to assure that the discharge lasts sufficiently long to prevent the turning off of transistor 20 at the zero point in the cycle occurring after each positive half cycle. Therefore, the output pulse occurs when both inputs, or all inputs in a multiple input system, are approaching zero after the negative half cycle. Capacitor 24 can be connected to either transistor 20 or 30 to select the zero occurring after either the positive or the negative half cycle.

The output pulse occurs at the simultaneous zero point as explained. However, the circuit also produces a series of pulses that vary in magnitude as the zero points approach simultaneous occurrence and as they recede from simultaneous occurrence. As the inputs approach having their zero points in phase the output pulses increase in magnitude until a maximum output pulse is produced at the in phase zero points in the cycles. Similarly, the output pulses decrease in magnitude as the inputs recede from having their zero points in phase.

Figure 3:
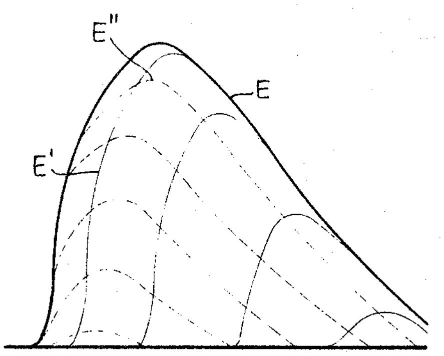
FIGURE 3 is a graphical drawing of the wave forms of the pulses produced by the circuit of FIG. 1.

This is shown in FIG. 3 with the solid curves showing the pulses appearing as the point of simultaneous occurrence of the zero points is approaching and the dotted curves showing the pulses appearing as the point of simultaneous occurrence of the zero points is past or receding. The envelope curve E is the output pulse appearing when the two inputs are simultaneously at their zero points.

Figure 2:
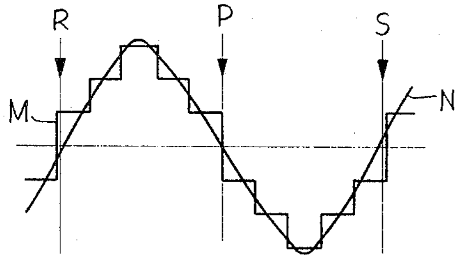
FIGURE 2 is a graphical drawing of two typical wave forms that may be compared with a circuit according to this invention.

The pulses shown in FIG. 3 occur only during the period when the zero points occur very closely to each other. For example, referring to FIGS. 2 and 3, as the two inputs shown, wave forms M and N of slightly different frequency cross their zero point simultaneously, as at point P, the envelope pulse E is produced. At point R the zero points are not quite simultaneous but are getting closer and the pulse E′ is produced. At point S the zero points are again not quite simultaneous and are separating and the pulse E″ is produced.

The increasing amplitude or magnitude of the output pulses enables the load, or subsequent responding circuitry, to be set to respond to a certain magnitude depending on the degree of phase accuracy required. The responding circuitry can be adjusted to respond to a selected amplitude of output pulse indicating a point as close to synchronism as desired. If accurate switching is required the responding circuitry can be adjusted to respond only to a maximum amplitude output pulse and thereby assure response to the output pulse only when the two inputs are substantially in phase at their zero point. The output pulses produced have a relatively steep slope on their leading edges and a shallow slope on their trailing edge as the zero points approach each other, and have a relatively shallow slope leading edge and relatively steep slope trailing edge as they recede from each other. The shape of the pulses produced as the zero points approach each other is a desirable shape because of the ease of designing responding circuitry that properly responds to the output pulse. The sharply rising leading edge enables rapid response to the pulse.

Similarly by responding to a lower amplitude, a predetermined time delay can be selected to allow for the time of response of any switching system responding to the output pulse. The time of the control pulse responded to would be selected so that the switching would occur at the zero points of the inputs.

In describing the invention the preferred embodiment has been shown and described but it is obvious to one skilled in the art that there are many variations, combinations, alterations and modifications that may be made without departing from the spirit of the invention or from the scope of the appended claims.

The embodiments of the invention for which an exclusive property or privilege is claimed are defined as follows:

1. An electrical circuit comprising first and second sources of electrical energy of alternating polarities;

a third source of electrical energy;

a load connected to the third source; and means connected to receive the electrical energy from the first and second sources and connected between the load and third source for controlling the flow of electrical energy from the third source to the load in response to a predetermined, instantaneous polarity relationship of the first and second source.

2. A circuit according to claim 1 wherein said means comprises:

one transistor responsive to a negative input;

another transistor responsive to a positive input;

said transistors connected to control the flow of electrical energy from the direct current source to the load; and means connected to the first and second source for separating the electrical energy from the first and second sources into positive polarity portions and negative polarity portions and for connecting said one transistor to receive the negative portions and for connecting said other transistor to receive the positive portions.

3. A circuit according to claim 2 wherein means are connected to said one transistor for maintaining said one transistor conductive for a predetermined time after removal of a positive input.

4. A circuit according to claim 3 wherein said means for maintaining comprises a capacitor.

5. A circuit responsive to a plurality of input signals of cyclically alternating polarity for producing an output pulse when the input signals are simultaneously at a predetermined point in their cycles, said circuit comprising:

means connected to receive the input signals for producing a first output varying as an instantaneous function of the negative portions of the input signals and for producing a second output varying as an instantaneous function of the positive portions of the input signals; and electronic switching means, each having an output circuit, connected to receive and responsive to the first and second outputs to control its output circuit condition, said switching means having its output circuit connected to a source of electrical energy to produce the output pulse at predetermined output circuit conditions.

6. A circuit according to claim 5 wherein the switching means is a semiconductor switching circuit.

7. A circuit according to claim 5 wherein the switching means is a transistor switching circuit.

8. A circuit responsive to a plurality of input signals of cyclically alternating polarity for producing an output pulse when the input signals are simultaneously at a predetermined point in their cycles, said circuit comprising:

means connected to receive the input signals for producing a first output varying as an instantaneous function of the negative portions of the input signals and for producing a second output varying as an instantaneous function of the positive portions of the input signals;

first electronic switching means, having an output circuit, connected to receive and responsive to the first output to control its output circuit condition;

second electronic switching means, having an output circuit, connected to receive and responsive to the second output to control its output circuit condition; and said first and second switching means having their output circuits connected to a source of electrical energy to produce the output pulse upon the simultaneous occurrence of predetermined output circuit conditions of the first and second output circuit.

9. A circuit responsive to a plurality of input signals of cyclically alternating polarity for producing an output pulse when the input signals are simultaneously at a zero point in their cycles, said circuit comprising:

means connected to receive the input signals for producing a first output varying as a function of the instantaneous sum of the negative portions of the input signals and for producing a second output varying as a function of the instantaneous sum of the positive portions of the input signals;

first semiconductor switching means, having an output circuit, connected to receive and responsive to the first output to control its output circuit condition;

second semiconductor switching means, having an output circuit, connected to receive and responsive to the second output to control its output circuit condition; and said first and second switching means having their output circuits connected to a source of electrical energy to produce the output pulse upon the simultaneous occurrence of predetermined output circuit conditions of the first and second output circuits indicating the zero points in the cycles of the input signals.

10. A circuit according to claim 9 wherein the first and second switching means are transistor switching circuits.

11. A circuit according to claim 9 wherein the circuit also comprises means connected to one of the switching means for additionally controlling the output condition of said one of the switching means to produce the output pulse only when the input signals are in phase at a zero point in their cycles.

12. A circuit connected to receive two electrical input signals of cylically alternating polarity for producing an output signal when the input signals are simultaneously at a zero point in their cycles, said circuit comprising:

means connected to receive the input signals for producing a first output varying as an instantaneous function of the sum of the negative portions of the input signals and for producing a second output varying as an instantaneous function of the sum of the positive portions of the input signals;

first semiconductor switching means, having an output circuit, connected and responsive to the first output to open its output circuit when said first output is substantially zero;

second semiconductor switching means, having an output circuit, connected and responsive to the second output to open its output circuit when said second output is substantially zero; and said two switching means output circuits connected in parallel across said source of electrical energy to produce the output signal upon simultaneous opening of the output circuits of the first and second switching means.

13. A circuit according to claim 12 wherein the circuit also comprises means connected to one of the switching means for delaying the opening of the output circuit of said one of the switching means.

14. A circuit for producing an output pulse when two input signals of alternating polarity are substantially simultaneously at a zero point in their cycles, said circuit comprising:

means connected to receive the input signals for separating the input signals into a first output consisting of the negative portions of the input signals and into a second output consisting of the positive portions of the input signals;

a first transistor having an output circuit and an input circuit connected to receive the first output and responsive to a negative input to turn on said first transistor;

a second transistor having an output circuit and an input circuit connected to receive the second output and responsive to a positive input to turn on said second transistor;

said transistor output circuits connected in parallel across a source of electrical potential; and, a load connected across said parallelly connected transistor output circuits.

15. A circuit according to claim 14 wherein said circuit also comprises means connected to one of the transistors for storing electrical energy from the input to maintain said one of the transistors conductive for a portion of a cycle.

16. An electrical circuit comprising:

first and second sources of alternating current of dissimilar frequencies;

a direct current source having positive and negative terminals;

a PNP transistor having a base, emitter, and collector with said emitter connected to the positive terminal, said collector connected to the negative terminal, and said base connected to the first and second source, said PNP transistor biased to turn on its emitter-collector circuit when said base is at a negative potential and to turn off its emitter-collector circuit when said base is at a zero potential;

a NPN transistor having a base, emitter, and collector with said emitter connected to the negative terminal, said collector connected to the positive terminal, and said base connected to the first and second sources, said NPN transistor biased to turn on its emitter-collector circuit when said base is at a zero potential;

diodes connected between the first source and the PNP transistor base and between the second source and the PNP transistor base to conduct only the negative portions of the alternating current;

a load connected in parallel with the emitter-collector circuits of the transistors.

17. A circuit according to claim 16 wherein said electrical circuit also comprises an electrical energy storage means connected across the base-collector circuit of one of the transistors.

18. A circuit according to claim 12 wherein said electrical energy storage means is a capacitor.

19. A system for producing an output signal across two output terminals when two alternating current signals of different frequencies are simultaneously in phase at a zero point in their cycles, said system comprising:

a source producing a first A.C. signal;

another source producing a second A.C. signal having a nonsynchronously different frequency from the first A.C. signal;

means connected to receive the A.C. signals for producing a first output equal to the simultaneous sum of the negative portions of the A.C. signals, and for producing a second output equal to the simultaneous sum of the positive portions of the A.C. signals;

a PNP transistor having a base, emitter, and collector with the base connected to receive the first output, said PNP transistor biased to be conductive when its base is negative;

a NPN transistor having a base, emitter, and collector with the base connected to receive the second output, said NPN transistor biased to be conductive when its base is positive;

a source of direct current;

said transistors connected in parallel across the source of direct current with the emitter of the first transistor connected to the collector of the second transistor and to the positive potential of the direct current source to provide the first output terminal, and with the collector of the first transistor connected to the emitter of the second transistor and to the negative potential of the direct current source to provide the second output terminal; and a capacitor connected between the base and collector of one of the transistors.

References Cited by the Examiner

FOREIGN PATENTS 592,233 2/1960 Canada.

ARTHUR GAUSS, *Primary Examiner.*

J. BUSCH, *Assistant Examiner.*